United States Patent [19]

Derango et al.

[11] Patent Number: 5,761,193
[45] Date of Patent: Jun. 2, 1998

[54] METHOD FOR PRE-ESTABLISHING COMMUNICATIONS IN A WIRELESS COMMUNICATION NETWORK

[76] Inventors: Mario F. Derango, 194 Sierra Pass Dr., Schaumburg, Ill. 60194; John W. Maher, 2845 Boerderji Way, Woodstock, Ill. 60098; Russell A. Marten, 1100 Carriage La., Schaumburg, Ill. 60193

[21] Appl. No.: 656,132

[22] Filed: May 31, 1996

[51] Int. Cl.$^6$ .................................................. H04Q 7/20
[52] U.S. Cl. ............... 370/312; 370/338; 370/349; 370/390; 455/426; 455/520
[58] Field of Search ................ 370/312, 328, 370/338, 340, 349, 389, 390, 432, 522, 261; 455/426, 432, 433, 435, 456, 463, 466, 518, 519, 520

[56] References Cited

U.S. PATENT DOCUMENTS

| | | | |
|---|---|---|---|
| 4,723,264 | 2/1988 | Sasuta et al. | 455/410 |
| 5,450,405 | 9/1995 | Maher et al. | 370/261 |
| 5,475,683 | 12/1995 | Harrison et al. | 370/332 |
| 5,535,426 | 7/1996 | Leigh et al. | 455/520 |
| 5,566,181 | 10/1996 | Huang et al. | 370/312 |

*Primary Examiner*—Hassan Kizou
*Attorney, Agent, or Firm*—Christopher P. Moreno

[57] ABSTRACT

Network access delays are minimized by using affiliation messages to pre-establish communications in a wireless communication network (100). In a first embodiment, connections between a site and a multicast server are not pre-assigned. A controller (102), upon receiving an affiliation message from a site (104), establishes connections between the site and a multicast server (111), the connections being uniquely associated with a talkgroup/site affiliation indicated by the affiliation message. In a second embodiment, connections between the site and the multicast server are pre-arranged. Thus, responsive to the affiliation message received from the site, the controller informs the multicast server that a talkgroup is affiliated with the site. Regardless of whether the first or second embodiment is used, the multicast server routes packetized information corresponding to the talkgroup to those sites with which the talkgroup is affiliated.

16 Claims, 4 Drawing Sheets

—PRIOR ART—

METHOD FOR PRE-ESTABLISHING COMMUNICATIONS IN A WIRELESS COMMUNICATION NETWORK

FIELD OF THE INVENTION

The present invention relates generally to wireless communication networks and, in particular, to a method for pre-establishing communications therein.

BACKGROUND OF THE INVENTION

FIG. 1 illustrates a prior art wireless communication network 100 in which a plurality of wireless communication sites (or zones) 104–107 are operably coupled to each other via a packet network 110. Typically, the packet network 110 will include a multicast server 111, the operation of which is described below. Wireless communication units 113–114, such as portable or mobile radios, can roam between the sites 104–107. Additionally, the wireless communication network 100 may include one or more operator positions 116, coupled to the packet network, which are capable of performing dispatch operations. A controller 102 (also referred to as a zone controller) serves to coordinate communications between the sites 104–107. In this capacity, the controller 102 maintains databases regarding talkgroup and site affiliations for the communication units 113–114, as well as performs call setup and resource allocation procedures, as known in the art.

When a communication unit 113 roams within the coverage area of a site 104, it affiliates with that site, i.e., the communication unit 113 alerts the site 104 that it is now within the coverage area of the site 104 by transmitting an affiliation message. Additionally, the communication unit 113, will notify the site 104 of its unit identification (the particular identification assigned to that unit) and its talkgroup identification (the particular talkgroup with which the communication unit is currently affiliated). As known in the art, talkgroups are a logical grouping of communication units such that communications can be initiated and conducted on a group-wide basis.

Inter-site communications are performed via the packet network 110. The packet network 110 typically comprises a packet network operating in accordance with well-known protocols such as Frame Relay or Asynchronous Transfer Mode, or with proprietary protocols that provide similar functionality. Although not shown in detail, each of the sites 104–107 comprises, in practice, one or more base stations operating under the control of a site controller and in communication with the packet network 110 via a gateway. The site controller and the gateway could exist as independent devices, or could be incorporated into the same physical implementation. The gateway "receives" the connections with the packet network 110 and, based on information included in the payload of individual packets, logically establishes the connections between the packet network 110 and the individual base stations within the site.

Currently, when an operator of a communication unit 113 attempts to communicate with other units in his or her talkgroup, they first transmit a communication request by depressing a push-to-talk (PTT) key. Upon receiving the communication request, the site 104 in which the communication unit 113 is currently operating forwards the communication request to the controller 102. In order to complete the group call, the controller 102 determines whether other sites are needed to complete the group call. For the purposes of the present invention, each operator position 116 is treated similar to a communication unit. In practice, the operator positions 116 may be part of a console site in which a group of operator positions (consoles) are connected to the packet network via a gateway, as described above. Alternatively, the operator positions can exist as separate, individual entities connected directly to the packet network.

Assuming that other sites are required to complete the group call, the controller 102, in response to the pending communication request, may have to establish connections, via the packet network 110, between the multicast server 111 and the various sites 104–107 to be included in the call. As known in the art, the multicast server 111 takes as input packetized information (i.e., packets of voice and/or data communications) and destination addresses. The multicast server 111 then copies the packetized information and routes the copies to each of the supplied destination addresses. To the extent that the destination addresses correspond to sites (or consoles), the multicast server 111 implements the one-to-many functionality required for group calls.

Two methods currently exist for providing the required connections between the multicast server 111 and the sites 104–107. In the first method, so-called permanent virtual circuit (PVC) connections are statically created when the system is initialized or when the system is permanently modified. PVCs are implemented by statically defining addresses within routing tables throughout the packet network. In this manner, a "circuit" is always available to the extent that there is always address capability between predetermined sources and destinations, i.e., sites and a multicast server. However, the use of PVCs becomes increasingly impractical and complex as the number of sites within the communication system increases. Additionally, the destination addresses must be determined and provided to the multicast server prior to allowing a group call to proceed, thereby adding some delay to the setup of the group call.

The second method for providing connections relies on so-called switched virtual circuit (SVC) connections. SVCs are implemented by creating, on demand, temporary routing addresses between switching nodes within the packet network. In this manner, there is no need to statically define addresses ahead of time. However, each switching node used to create a given SVC typically requires 1–30 ms. to establish the required temporary routing addresses and pass that information along to the next switching node. Because it is often likely that a given SVC will pass through multiple switching nodes, the delay incurred in its creation (in response to a communication request) can be on the order of hundreds of milliseconds.

Thus, before the communication request can be serviced, significant network delays are added to the delays already imposed by the sites and the controller. Given that access times are a significant factor in user perceptions of overall system quality, the need to keep system delays to a minimum is paramount. Therefore, it would be advantageous to provide a technique that allows connections within the packet network to be established such that additional delays are minimized.

DESCRIPTION OF A PREFERRED EMBODIMENT

The present invention provides a method for pre-establishing communications within a wireless communication network such that access delays are minimized. In a first embodiment, connections between a site and a multicast server are not pre-assigned. A controller receives an affiliation message from a site. The affiliation message, sourced by a communication unit within the site, indicates that a talkgroup corresponding to the communication unit is affiliated with the site. Responsive to the affiliation message, the controller establishes connections within a packet network between the site and a multicast server.

In a second embodiment, connections between the site and the multicast server are pre-arranged within the packet network. In this case, responsive to the affiliation message received from the site, the controller informs the multicast server that the talkgroup corresponding to the communication unit is affiliated with the site. Regardless of whether the first or second embodiment is used, the multicast server will route input packets of information corresponding to the talkgroup to those sites with which that talkgroup is affiliated. Using this method, the delays inherent to establishing SVC and PVC connections responsive to a communication request are overcome, thereby minimizing overall system access delays.

Figure 1:
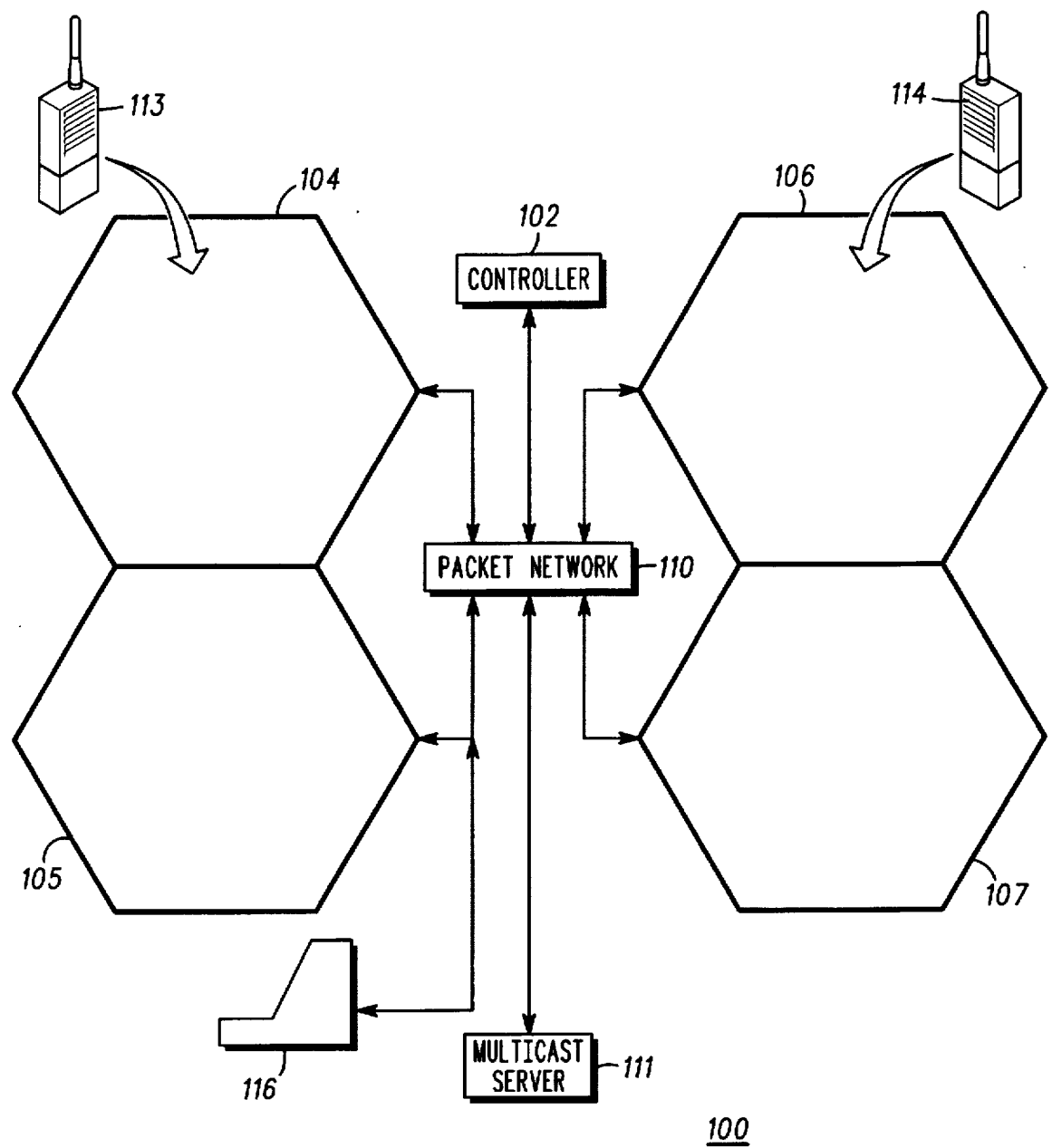
FIG. 1 is a block diagram of a prior art wireless communication network.
Figure 2:
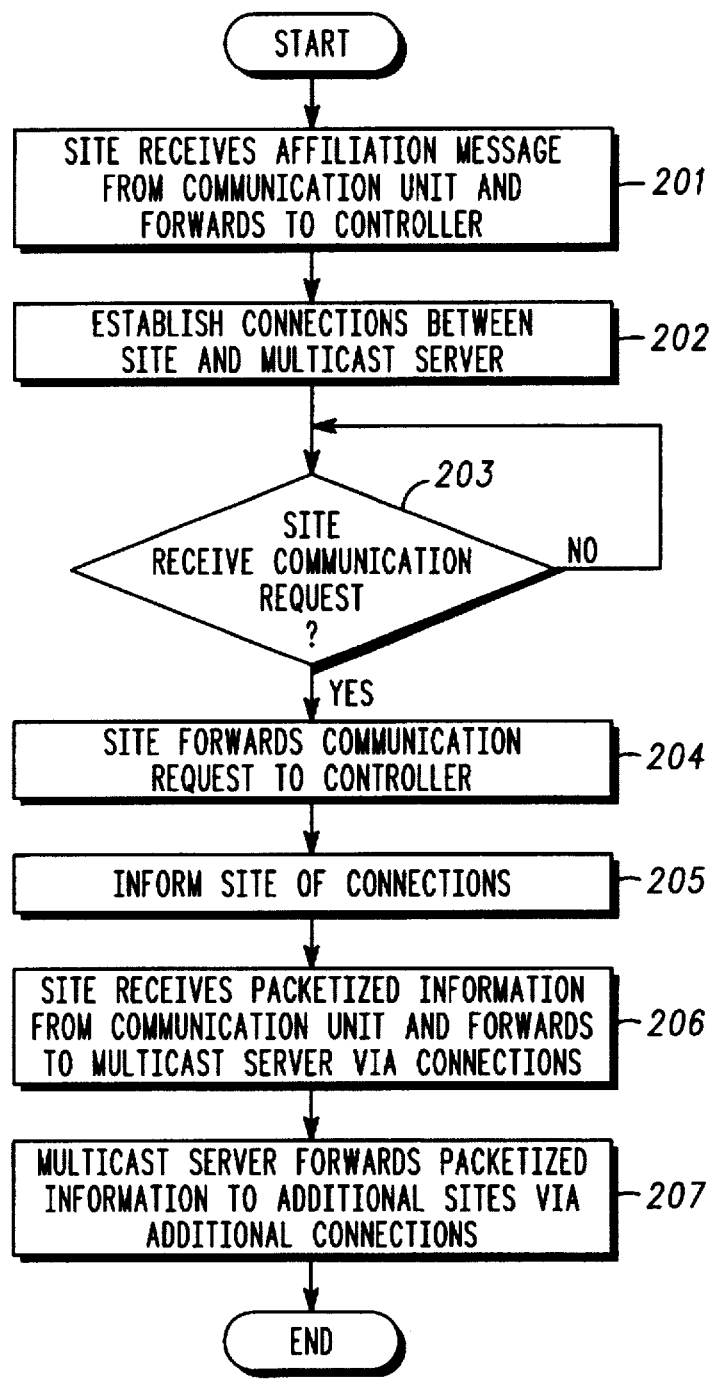
FIG. 2 is a flowchart illustrating a first embodiment of a method for pre-establishing communications based on an affiliation message in a wireless communication network.

The present invention can be more readily described with reference to FIGS. 2-5. FIG. 2 is a flowchart illustrating a first embodiment of a method for pre-establishing communications based on an affiliation message in a wireless communication network. The first embodiment is applicable to those situations where there are no pre-arranged connections between sites and a multicast server. At step 201, a site receives an affiliation message from a communication unit and forwards the affiliation message to a controller. As described above, the affiliation message alerts the site to the unit's presence within the coverage area of the site. Of equal importance, the affiliation message indicates that the talkgroup which the communication unit has currently selected (i.e., talkgroup that the unit is monitoring) is now also affiliated with the site. For example, in FIG. 1, a first communication unit 113 roams within the coverage area of a first site 104. In so doing, the first communication unit 113 informs the first site 104 of its unit ID and that it has currently selected talkgroup "A", as hereinafter assumed. This information is then forwarded to the controller 102.

At step 202, responsive to the affiliation message forwarded at step 201, connections between the site and a multicast server are established. In the preferred embodiment, the connections comprise SVC connections, the establishment of which is well known in the art. In practice, the connections between a site and a multicast server comprise a single bidirectional SVC. Thus, a single SVC comprises at least an inbound portion (from the site to the multicast server) and an outbound portion (from the multicast server to the site).

The first embodiment of the present invention encompasses two methods for establishing the connections. In the first method, the controller establishes the connections; in the second method, the controller instructs the multicast server to establish the connections. Regarding the first method, the controller first determines whether the talkgroup indicated by the affiliation message is already affiliated with the site. If so, connections corresponding to the talkgroup already exist between the site and the multicast server. If not, the controller affiliates the talkgroup with the site, for example, using an entry in a table stored in memory. Additionally, the controller requests the SVC connection from the packet network (using known techniques) and adds the SVC identifiers subsequently established to each relevant table entry. An example of such a table is illustrated in Table 1.

TABLE 1

| Talk Group | Site ID | Inbound SVC | Outbound SVC | Outbound SVC | ... | Outbound SVC |
|---|---|---|---|---|---|---|
| A | 1 | X1 | Y4 | Y6 | ... | Y9 |
| A | 4 | X4 | Y1 | Y6 | ... | Y9 |
| B | 7 | X7 | Y2 | | | |
| A | 6 | X6 | Y9 | Y4 | ... | Y1 |
| B | 2 | X2 | Y7 | | | |
| A | 9 | X9 | Y1 | Y4 | ... | Y6 |
| C | 1 | X1 | | | | |

As shown in Table 1, an "Inbound SVC" and "Outbound SVC"actually indicate the inbound and outbound portions of respective bi-directional SVCs. Thus, for example, X7 and Y7 are the inbound and outbound portions, respectively, of the same SVC. From the example of Table 1, talkgroup "AA" is affiliated with sites 1, 4, 6 and 9; talkgroup "B"is affiliated with sites 2 and 7; and talkgroup "C" is affiliated with site 1. A feature to be noted is that a single SVC can support more than one talkgroup. This is shown where talkgroups A and C at site 1 use the same inbound portion, X1, of an SVC.

In constructing the entries of the table, the controller continually updates existing entries as new talkgroup/site affiliations are created. Assuming, for example, that talkgroup "A"became affiliated with site 1 after the most recent affiliation message, the other talkgroup "A"/site entries are augmented to include the newly-created outbound SVC portion Y1 in their lists of outbound SVCs.

Where a talkgroup is affiliated with two or more sites, it necessarily follows that packetized information for a given talkgroup received via an inbound SVC should be replicated to all other sites affiliated with that talkgroup. This is reflected in Table 1. For example, packets corresponding to talkgroup "A" received via inbound SVC portion X1 are to be replicated on outbound SVC portions Y4, Y6 and Y9. However, packets received for talkgroup "IC" via inbound SVC portion X1 do not need to be replicated because there are no other entries for talkgroup "C", indicating that the talkgroup is currently represented in only one site.

Although not shown as part of Table 1, the controller also maintains information regarding which communication units are associated with a given talkgroup at a particular site. Thus, when an affiliation message is received, the communication unit ID associated with that affiliation message is added to a list of units for the talkgroup currently within the coverage are of the given site. In this manner, the controller can determine the number of communication units within a site that are associated with a particular talkgroup.

It is understood that other implementations of the table used by the controller are available. In particular, it is recognized that the example presented by Table 1 contains redundant information; this method simplifies the table for illustration purposes. At a minimum, any implementation of the controller table must associate the one or more inbound SVC portions for a given talkgroup with the outbound SVC portions corresponding to the other sites associated with the given talkgroup.

Continuing with the first method in which the controller establishes the connections, step 202 includes the controller informing the multicast server of the connections. (In practice, control connections, such as SVCs or PVCs, between the controller and the multicast server are established when the system is first set up.) In particular, the controller sends the multicast server the talkgroup and site IDs as well as the SVC identifiers (inbound and outbound portions) so that the multicast server can reproduce the table used by the controller, e.g., Table 1. In reproducing the controller's table, the multicast server is effectively notified that it should copy packets of information received from a given talkgroup/inbound SVC portion combination to the corresponding outbound SVC portions listed in the table. At this point, the connections needed for any subsequent group communications for any given talkgroup have been pre-established via the packet network. By using affiliation messages to pre-establish connections prior to a communication request, the first embodiment of the present invention avoids unacceptable delays that would be incurred if the connections were established only when a communication request is received.

Regarding the second method for establishing connections at step 202, the controller instructs the multicast server to establish the connections. As in the first method, the controller first determines whether connections between site and the multicast server already exist. If not, rather than requesting the connections itself, the controller instructs the multicast server to create the connections. The process of creating in the controller and the multicast server a table functionally similar to Table 1 is essentially the same, except that the multicast server informs the controller of the connections once they are established.

At step 203, it is determined whether any site (including a console site as described above) has received a communication request. In practice, such a determination is made at the sites (including a console site). The communication request specifies a talkgroup to be included in the call. Assuming that a communication request is received at a site, the communication request is forwarded to the controller at step 204.

In response to the communication request, the controller, via the packet network, informs the site of the previously established connections at step 205, i.e., the controller sends a message to the site via the packet network. Because the connections have already been established, in response to the affiliation message, the step of informing the site of the connections takes significantly less time than it would if the connections were created in response to the communication request.

At step 206, the site corresponding to the communication request receives packetized information from the communication unit or console that originally sourced the communication request. The packetized information is then forwarded by the site to the multicast server based on the information received at step 205, i.e., the inbound SVC portion identifier. Packetized information and the various methods for handling it within a packet network environment are well known in the art.

At step 207, the multicast server forwards the packetized information received from the site to additional sites as stipulated by the table information. That is, the multicast server will receive the packetized information via the inbound SVC corresponding to the talkgroup/site and copy the packetized information out to each site corresponding to the outbound SVCs listed in the table for that talkgroup/inbound SVC entry. In this manner, the multicast server does not need to receive any destination addresses at the time of a communication request as in prior art implementations because such destination addresses are inherently included in the table described above at the time of affiliation.

Figure 3:
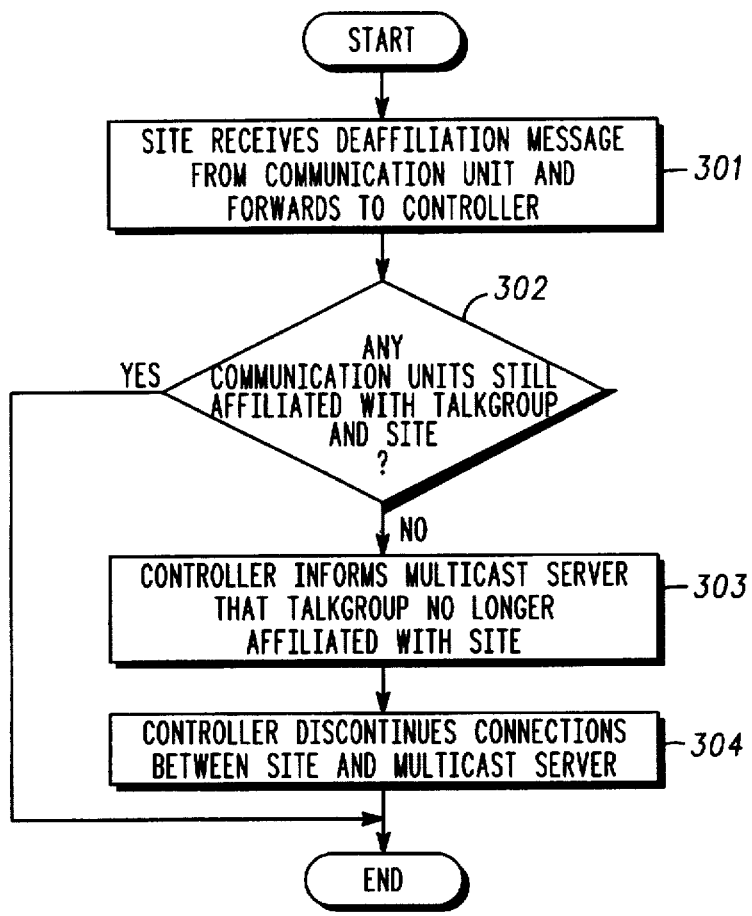
FIG. 3 is a flowchart illustrating a method for processing a deaffiliation message in accordance with the first embodiment.

FIG. 3 is a flowchart illustrating a method for processing a deaffiliation message in accordance with the first embodiment described with regard to FIG. 2. At step 301, a site receives a deaffiliation message from a communication unit within the site's coverage area. The deaffiliation message is then forwarded to the controller. As known in the art, the deaffiliation message results when a communication unit undergoes a deaffiliation event, i.e., switches from a current talkgroup to a different talkgroup, affiliates with another site, or powers down. At a minimum, the deaffiliation message includes the identification of the communication unit and the identification of the talkgroup currently selected by the unit.

Upon receiving the deaffiliation message, the controller, at step 302, determines whether any communication units for the associated talkgroup (i.e., the talkgroup prior to the deaffiliation event) are still affiliated with the site. As described above, the controller maintains information regarding the identities, and hence the number, of communication units affiliated with a given talkgroup and site. If there are still communication units affiliated with the site and monitoring the talkgroup affected by the deaffiliation event, the previously established connections could still be needed in the future; therefore they are not discontinued.

If there are no more communication units affiliated with the site and monitoring the talkgroup, the controller informs the multicast server that the talkgroup is no longer associated with the site at step 303. In effect, the controller would update its own table and inform the multicast server to do the same. For example, referring to Table 1, if the controller determines that there are no longer any communication units affiliated with talkgroup "A" at site 4, then the controller would delete from all entries corresponding to talkgroup "A" all references to the inbound and outbound SVC portions, X4 and Y4 (previously used to support talkgroup "A" at site 4). Likewise, the multicast server would be instructed to similarly update its table.

Because there are no longer any communication units affiliated with the talkgroup and site, there is no longer a need for the previously established connections. Thus, at step 304, the controller discontinues the connections (corresponding to the talkgroup) between the site and multicast server. For instance, continuing with the above example, the controller would signal into the packet network to discontinue the inbound and outbound SVC portions identified as X4 and Y4. In practice, this would cause the various switching nodes within the packet network to remove the temporary addresses assigned to the SVC connection.

Figure 4:
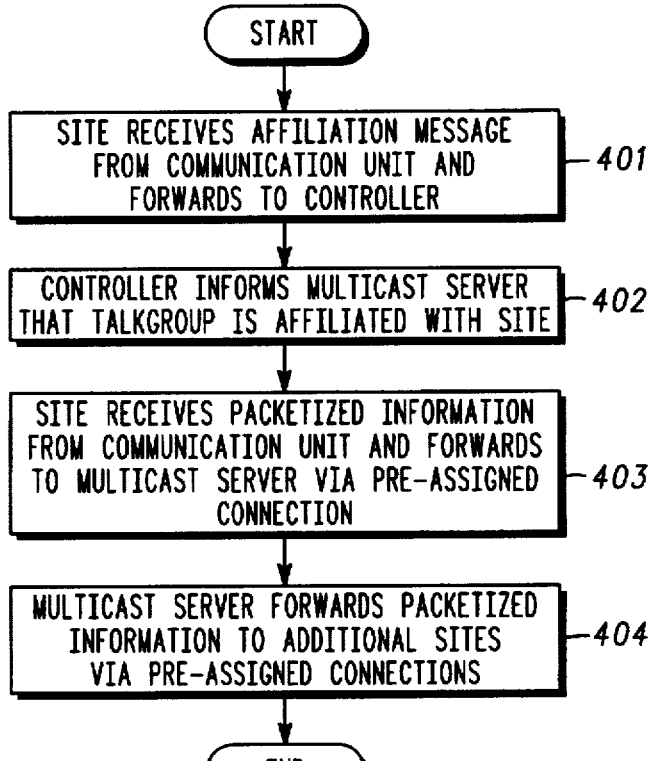
FIG. 4 is a flowchart illustrating a second embodiment of a method for pre-establishing communications based on an affiliation message in a wireless communication network.

FIG. 4 is a flowchart illustrating a second embodiment of a method for pre-establishing communications based on an affiliation message in a wireless communication network. The second embodiment is applicable to those situations where there are pre-arranged connections via the packet network between sites and a multicast server. Thus, each site has information regarding the identity of connections with the multicast server, and vice versa, such that there is no need to establish such connections on demand. In the preferred embodiment, these pre-arranged connections are PVCs. Thus, the multicast server will include, at the time the PVCs are set up, a table of sites and their corresponding inbound and outbound PVCs. At step 401 (identical to step 201 described above), a site receives an affiliation message from a communication unit and forwards the affiliation message to a controller. The affiliation message indicates that the talkgroup currently selected by the communication unit is now also affiliated with the site. The affiliation message allows the controller to compile a table, similar to Table 1 above, that reflects the talkgroup/site affiliations and their corresponding PVCs, as shown in Table 2.

TABLE 2

| Talk Group | Site ID | Inbound PVC | Outbound PVC | Outbound PVC | ... | Outbound PVC |
|---|---|---|---|---|---|---|
| A | 1 | X1 | Y4 | Y6 | ... | Y9 |
| A | 4 | X4 | Y1 | Y6 | ... | Y9 |
| B | 7 | X7 | Y2 | | | |
| A | 6 | X6 | Y9 | Y4 | ... | Y1 |
| B | 2 | X2 | Y7 | | | |
| A | 9 | X9 | Y1 | Y4 | ... | Y6 |
| C | 1 | X1 | | | | |

TABLE 2

Table 2 is identical to Table 1 with the exception that it shows PVCs in the place of SVCs. A single PVC can support more than one talkgroup. This is shown where talkgroups A and C use the same inbound PVC X1. Generally, PVCs are bi-directional, however, as used in the present invention, PVCs are used in a unidirectional manner. Because the PVCs are used in a unidirectional manner, each inbound and outbound PVC shown in Table 2 refers to a separate PVC.

As described above, the controller updates existing entries as new talkgroup/site affiliations are created. Assuming, for example, that talkgroup "A"became affiliated with site 1 after the most recent affiliation message, the other talkgroup "A"/site entries are augmented to include the outbound PVC (Y1) in their lists of outbound PVCs.

Responsive to the affiliation message, the controller, at step 402, informs the multicast server that the talkgroup is affiliated with the site. In particular, the controller sends the multicast server the talkgroup and site IDs so that the multicast server can reproduce the table used by the controller, e.g., Table 2. In reproducing the controller's table, the multicast server is effectively notified that it should copy packets of information received from a given talkgroup/inbound PVC combination to the corresponding outbound PVCs listed in the table. In effect, the destination addresses for a given talkgroup communication are inherently determined when establishing the table. By using affiliation messages to pre-establish communications between the site and the multicast server, the second embodiment of the present invention avoids the delays that would be incurred if the multicast server was informed of the destination addresses only when a communication request is received.

At step 403, the site receives packetized information and forwards the packetized information to the multicast server via its corresponding inbound PVC. (In practice, a communication request would be received and processed by the controller prior to the site receiving and forwarding packetized information. However, such steps are ancillary for the purposes of the second embodiment of the present invention.)

The site—including a console site—which received the communication request serves as the source of the packetized information in step 403.)

At step 404, the multicast server forwards the packetized information received from the site to additional sites as stipulated by the table information. That is, the multicast server will receive the packetized information via the inbound PVC corresponding to the talkgroup/site and copy the packetized information out to each site corresponding to the outbound PVCs listed in the table for that talkgroup/inbound PVC entry. In this manner, the multicast server does not need to receive any destination addresses at the time of a communication request as in prior art implementations because such destination addresses are inherently included in the table described above at the time of affiliation.

Figure 5:
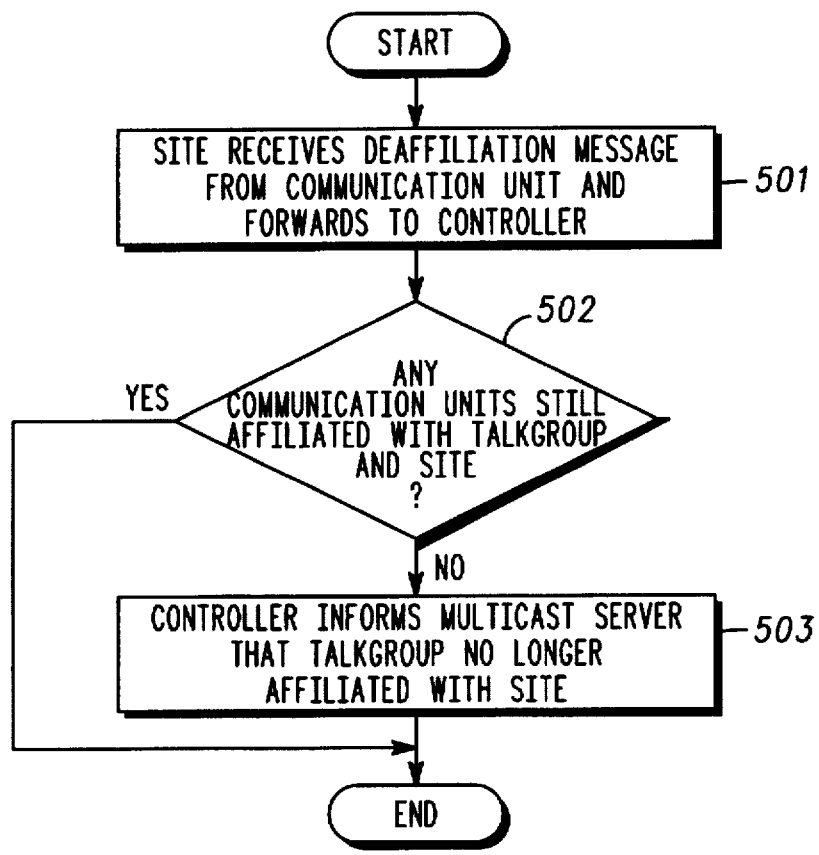
FIG. 5 is a flowchart illustrating a method for processing a deaffiliation message in accordance with the second embodiment.

FIG. 5 is a flowchart illustrating a method for processing a deaffiliation message in accordance with the second embodiment described with regard to FIG. 4. At step 501, a site receives a deaffiliation message from a communication unit within the site's coverage area. The deaffiliation message is then forwarded to the controller.

Upon receiving the deaffiliation message, the controller, at step 502, determines whether any communication units for the associated talkgroup are still affiliated with the site. If there are still communication units affiliated with the talkgroup and site, the multicast server is not updated because future communications may include the talkgroup/site.

If there are no more communication units affiliated with the talkgroup and the site, the controller informs the multicast server that the talkgroup is no longer associated with the site at step 503. In effect, the controller would update its own table and inform the multicast server to do the same. For example, referring to Table 2, if the controller determines that there are no longer any communication units affiliated with talkgroup "A"at site 4, then the controller would delete from all entries corresponding to talkgroup "A" all references to the inbound and outbound PVCs, X4 and Y4 (previously used to support talkgroup "A"at site 4). Likewise, the multicast server would be instructed to similarly update its table. Because the connections involved are permanent, there is no need to discontinue the connections as in the SVC case; the act of deleting the PVC entries from the table effectively "discontinues" the use of the PVCs for future inter-site group calls.

The present invention provides a method for pre-establishing communications within a wireless communication network such that access delays are minimized. Additionally, the need to inform a multicast server of destination addresses at the time of call setup is eliminated. This is achieved by pre-establishing communications upon reception of affiliation messages, rather than communication requests. In this manner, the present invention avoids network setup delays that can extend into hundreds of milliseconds. Consequently, the perceived user delay in call setup and processing is correspondingly minimized.

We claim:

1. In a wireless communication network comprising a controller, a plurality of sites, and a plurality of communication units arranged into a plurality of talkgroups, wherein a communication unit of the plurality of communication units, upon coming in range of a site of the plurality of sites, affiliates with the site and also with a talkgroup of the plurality of talkgroups, and wherein the plurality of sites and the controller are linked together by a packet network that includes a multicast server, a method for the controller to pre-establish communications between the site and the multicast server, the method comprising steps of:

a) receiving, by the controller from the site, an affiliation message when the communication unit affiliates with the site and the talkgroup; and b) establishing, responsive to the affiliation message, connections between the site and the multicast server via the packet network.

2. The method of claim 1, step (b) further comprising the step of establishing the connections between the site and the multicast server, wherein the connections comprise switched virtual circuits.

3. The method of claim 2, step (b) further comprising the step of establishing the connections between the site and the multicast server by the controller.

4. The method of claim 3, step (b) further comprising steps of:

at the controller, prior to establishing the connections:

b1) determining that the talkgroup is not yet affiliated with the site; and b2) affiliating the talkgroup with the site.

5. The method of claim 4, further comprising a step of:

at the controller:

b3) informing the multicast server of the connections between the site and the multicast server.

6. The method of claim 5, further comprising steps of:

c) receiving, at the controller, a communication request from the site; and d) informing, via the packet network, the site of the connections responsive to the communication request.

7. The method of claim 6, further comprising steps of:

e) receiving, at the site, packetized information from the communication unit;

f) forwarding, by the site, the packetized information to the multicast server via the connections; and g) forwarding, by the multicast server, the packetized information to the additional sites via additional connections between the additional sites and the multicast server.

8. The method of claim 2, step (b) further comprising the step of establishing the connections between the site and the multicast server, wherein the controller instructs the multicast server to establish the connections.

9. The method of claim 8, step (b) further comprising steps of:

at the controller, prior to establishing the connections:

b1) determining that the talkgroup is not yet affiliated with the site; and b2) affiliating the talkgroup with the site.

10. The method of claim 9, further comprising steps of:

c) receiving, at the controller, a communication request from the site; and d) informing, via the packet network, the site of the connections responsive to the communication request.

11. The method of claim 10, further comprising steps of:

e) receiving, at the site, packetized information from the communication unit;

f) forwarding, by the site, the packetized information to the multicast server via the connections; and g) forwarding, by the multicast server, the packetized information to additional sites of the plurality of sites via additional connections between the additional sites and the multicast server.

12. The method of claim 2, further comprising steps of:

c) receiving, at the controller, a deaffiliation message from the site;

d) determining, by the controller responsive to the deaffiliation message, that no communication units are affiliated with the talkgroup and the site;

e) informing, by the controller, the multicast server that the talkgroup is no longer affiliated with the site; and f) discontinuing, by the controller, the connections between the site and the multicast server.

13. In a wireless communication network comprising a controller, a plurality of sites, and a plurality of communication units arranged into a plurality of talkgroups, wherein a communication unit of the plurality of communication units, upon coming in range of a site of the plurality of sites, affiliates with the site and also with a talkgroup of the plurality of talkgroups, wherein the plurality of sites and the controller are linked together by a packet network that includes a multicast server, and wherein the packet network has pre-assigned connections from each site to all other sites and the multicast server, a method for the controller to pre-establish communications between the site and the multicast server, the method comprising steps of:

a) receiving, by the controller from the site, an affiliation message when the communication unit affiliates with the site and the talkgroup; and b) informing the multicast server that the talkgroup is affiliated with the site responsive to the affiliation message.

14. The method of claim 13, step (b) further comprising a step of:

at the controller:

b1) determining that the talkgroup is not yet affiliated with the site.

15. The method of claim 14, further comprising steps of:

c) receiving, at the site, packetized information from the communication unit;

f) forwarding, by the site, the packetized information to the multicast server via the pre-assigned connections; and g) forwarding, by the multicast server, the packetized information to additional sites of the plurality of sites that are currently affiliated with the talkgroup.

16. The method of claim 13, further comprising steps of:

c) receiving, at the controller, a deaffiliation message from the site;

d) determining, responsive to the deaffiliation message, that no communication units are affiliated with the talkgroup and the site; and e) informing the multicast server that the talkgroup is no longer affiliated with the site.

* * * * *